No. 830,963. PATENTED SEPT. 11, 1906.
A. BRYAN & W. JONES.
SPRINKLER.
APPLICATION FILED DEC. 11, 1905.
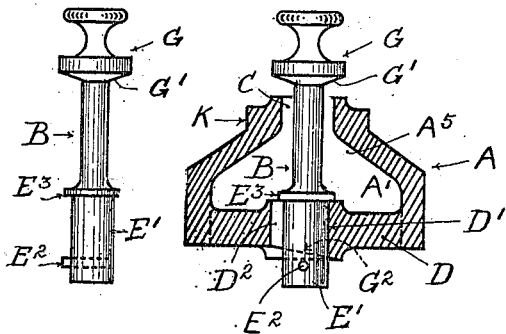
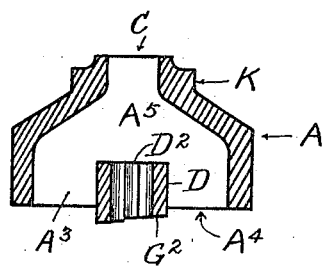
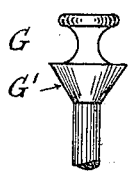
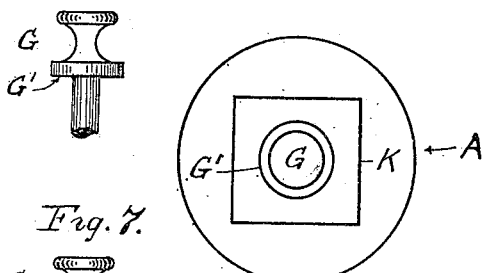
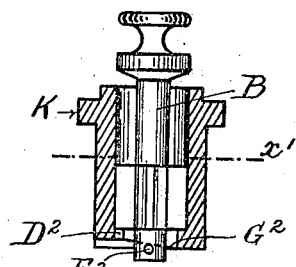
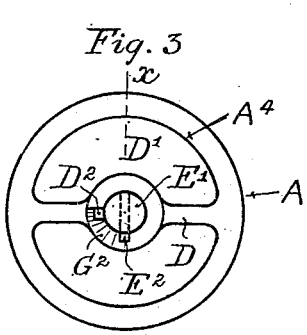
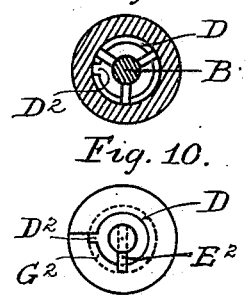
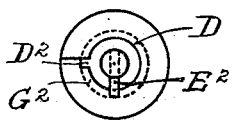
Witnesses.
James L. Norris,
Robert Everett,
Inventors.
Arthur Bryan
Walter Jones.
By James L. Norris.
Atty.

UNITED STATES PATENT OFFICE.

ARTHUR BRYAN, OF MINWORTH HALL, MINWORTH, AND WALTER JONES, OF HOLLY MOUNT, REDHILL, ENGLAND.

SPRINKLER.

No. 830,963.　　　　　Specification of Letters Patent.　　　Patented Sept. 11, 1906.

Application filed December 11, 1905. Serial No. 291,345.

*To all whom it may concern:*

Be it known that we, ARTHUR BRYAN, engineer, of Minworth Hall, Minworth, in the county of Warwick, and WALTER JONES, manufacturer, of Holly Mount, Red hill, in the county of Worcester, England, subjects of the King of Great Britain, have invented certain new and useful Improvements in Sprinklers, of which the following is a specification.

This invention has relation to sprinklers or devices or appliances for spraying and sprinkling or distributing various liquids—such as partially-treated liquid sewage, trade effluents, water, and the like—over surrounding surfaces or areas.

Although the improved devices are applicable for a variety of purposes, they are primarily adapted to be used in sewage-purification works, where the percolating bacteria-bed treatment is adapted for sprinkling or distributing the hydrolized sewage or septic tank effluent over the purifying medium of the percolation or oxidizing beds, the sprinklers in such cases being usually fitted at suitable intervals along the tops of fixed distributing-pipes branching from main feed-pipes which are arranged above the bed and in which a sufficient pressure-head is maintained to insure the spraying of the liquid on same being forced through the sprinklers.

One of the principal objects of this invention is to construct a simple, cheap, and efficient sprinkler which will have an effective spraying action when used in connection with liquids subjected to low pressures or having only a few feet of "head" and which will not be liable to become choked, clogged up, or deranged by solid matter or bodies in suspension which may (in the case of sewage) have resisted the preliminary hydrolytic treatment in the septic-tanks and escaped interception by the silt-tanks, with which the percolating-beds are usually connected.

Another object is to provide low-pressure sprinklers with a spreader device which is readily detachable to facilitate cleansing or the like and is, furthermore, so formed or provided as to positively insure the formation by each sprinkler in a series or installation of a spray of like character and volume, so that the liquid will be distributed evenly over the whole of a percolating bed or like surface.

These objects it is proposed to attain by the employment, in conjunction with a hollow body whose internal formation is such as to afford free and ample passage for the liquid, of a detachable plug having a sprayer or spreader head or enlargement, which is supported and elevated above an annular outlet of the body and against the under side of which the issuing liquid is made under the influence of its own pressure or head to forcibly impinge and be thereby pulverized or converted into a spray, which sprinkles or spreads itself evenly over the surrounding area or surface and by providing the stem of the detachable plug with a stop arrangement which positively determines the position of the elevated spreader-head with respect to the outlet-hole in the body.

Figure 1 of the accompanying drawings represents a transverse vertical section of one form of sprinkler constructed in accordance with the invention and particularly adapted for the distribution of liquid sewage over percolating bacteria-beds. Fig. 2 is a top side plan of Fig. 1. Fig. 3 is an under side plan of the said sprinkler, and Fig. 4 is a transverse section of the body part only upon the dotted line $x$, Fig. 3. Fig. 5 shows an elevation of the plug detached or separated from the body part. Figs. 6 and 7 show two modified forms of plug that may be used. Fig. 8 is a sectional view of a modified form of sprinkler. Fig. 9 is a cross-section thereof upon the dotted line $x'$, and Fig. 10 is an under side plan of the body part separately.

The same letters of reference indicate corresponding parts in Figs. 1 to 7.

The improved sprinkler-fitting shown in these figures consists of two parts—viz., the fixed body A and the detachable plug B. The said body is hollow or has an internal chamber A', and its lower part A² is adapted to fit or socket into an opening in the distributing-pipe and is either retained therein by friction, as in the arrangement shown, or it may be made to screw into position or be secured by a bayonet-point or like connection. The lower part A³ of the chamber is circular and has an open bottom A⁴ in free communication with the distributing-pipe, while the upper part A⁵ is conoidal in form and leads at its apex into a circular outlet C.

Directed across the bottom opening is a bar or bridge D, serving as a carrier or support for the detachable plug B, which extends through and is held in a central and erect position with the outlet C, so as to leave an annular or cylindrical passage wherethrough the liquid is forced and is made to impinge against and be pulverized and sprayed by the under side G' of the elevated or superimposed spreader head or enlargement G, which is carried by the said plug at a distance above the annular outlet of the passage. This under side of the spreader-head is shaped according to the character of spray required and may either be flat or it may be coned to any extent between the limits represented by the flat form, Fig. 6, and the extreme conoidal shape shown in Fig. 7, or it may, if necessary, be of a curved or spheroidal form or be grooved or corrugated annularly or radially to give a better pulverizing effect.

The lower or inner end of the plug is provided with a stem or shank E', adapted to fit and be capable of sliding vertically within a socket or hole D' in the center of the bridge D, and the locking of the said plug to the body of the sprinkler is effected by a connection consisting of a stud, peg, or projection E² on the stem adapted to be passed through an upright and open-ended groove D² in the walls of the socket D and to be engaged by a partial rotation underneath the middle of the bridge, whose under side may be formed with a circular inclined plane G, surrounding the socket D.

At the upper end of the stem E' the plug is formed with a collar or stop-shoulder E³, which when the said stem has been passed fully home into the socket beds or seats against the fixed bridge, and so forms a means for positively positioning at a certain predetermined distance above the outlet of the body, while by the riding of the peg E² under the incline G² when the plug (which is preferably provided with an external knot or handle) is rotated the said plug is wedged or locked to the bridge and is secured against displacement by the action of the liquid-pressure against the head. These stop-collars serve as simple and effectual means for insuring the whole of the spreader-heads of a series or installation of sprinklers being all set at the same distance above their respective outlets, and so producing sprays of the same character and volume over the whole of a bacteria-bed or like surface. Further, instead of forming a bridge with socket inside the body of the sprinkler for carrying the detachable plug the said plug may in some cases be provided with a foot which fits into the bore or interior of the sprinkler and is provided with free or clear passages for the liquid to flow through. One such modification is shown in the Figs. 8, 9, and 10, in which the bore or passage through the body of the sprinkler is of the same diameter throughout, and the detachable plug B, carrying the spreader-head at a suitable distance above the outlet or nozzle end, is provided with a foot having a series of radial wings or webs which fit closely within the lower part of the said bore or chamber, while the spaces between them provide free passages for the flowing liquid. A stop-flange or shoulder D² is formed in the lower part of the bore to position the spreader-head with respect to the outlet or orifice and support the foot of the plug, whose lower extremity has a locking-peg E², adapted to be passed through a gap D² in the said shoulder and be made by a partial rotation of said plug to ride under an incline G², as in the previously-described arrangement for wedging or building the detachable part to the fixed part.

The outside of the body is preferably formed with flats K to take a spanner to facilitate the removal of the sprinkler from the distributing-pipe.

By the employment of sprinklers such as herein described free or ample internal passages for the liquid are provided, so that the appliances are not liable to become choked or clogged up when in use, while the provision of a spreader-plug which can be easily disconnected and detached from the body greatly facilitates the cleansing of the interior in the event of the passages becoming choked or obstructed. A further advantage attained by the improved construction is that in the event of it being necessary to alter the shape of the spreader-head, so as to insure the production of any particular character of spray, this can be readily accomplished either prior to or after the application of the sprinkler to a pipe by removing the plug and turning the under side of the spreader-head to the desired contour.

The application of the invention to sprinklers or spraying and distributing fittings for dealing with trade and other effluents, clear water, and other liquids differs in no essential particular from its application to sewage-sprinklers, as herein described.

Having now particularly described our invention, what we desire to claim and secure by Letters Patent is—

1. In a sprinkler, a hollow body having a mouth portion, a bridge supported within the hollow body and having a key-opening, a detachable plug having at one extremity a spreader-head, and at the other extremity a pin for engagement with the key-opening, and a collar on the plug forming a seat therefor, said bridge having an inclined surface for engagement with the pin carried by the plug to lock the latter in position on the bridge.

2. A sprinkler of the class described, involving a hollow body having a bridge provided with an opening at the interior thereof, said bridge further provided with an open-end groove in communication with the opening, a detachable plug mounted in the opening and having a spreader-head, a pin carried by the plug, said bridge having an inclined surface for engagement with the pin to lock the plug in a fixed position within the opening in the bridge, and means carried by the plug forming a seat therefor and for regulating the position of the spreader-head with respect to the said body.

3. A sprinkler of the class described, including a hollow conoidal-shaped body having a mouth portion, a bridge at the interior of the body and having a keyhole-socket, and further provided with an inclined surface at one side thereof, a plug having a spreader-head, a collar forming a stop for limiting the insertion of the plug within the keyhole-socket, and a pin for engagement with the inclined surface to lock the plug in a fixed position with the body.

In testimony whereof we have hereunto set our hands in presence of two subscribing witnesses.

ARTHUR BRYAN.
WALTER JONES.

Witnesses:
E. P. LLOYD,
K. THOS. BENSON.